United States Patent [19]

Grassmann

[11] Patent Number: 4,488,362
[45] Date of Patent: Dec. 18, 1984

[54] CAPACITIVE HIGH-FREQUENCY DRYING APPARATUS

[75] Inventor: Hans-Christian Grassmann, Igelsdorf, Fed. Rep. of Germany

[73] Assignee: Siemens Aktiengesellschaft, Munich, Fed. Rep. of Germany

[21] Appl. No.: 410,065

[22] Filed: Aug. 20, 1982

[30] Foreign Application Priority Data

Sep. 29, 1981 [DE] Fed. Rep. of Germany ....... 3138706

[51] Int. Cl.³ .............................................. F26B 23/08
[52] U.S. Cl. .............................................. 34/1; 34/68; 34/86; 219/10.81
[58] Field of Search ..................... 219/10.81; 34/1, 68, 34/86

[56] References Cited

U.S. PATENT DOCUMENTS 3,858,329  1/1975  Koide et al. ............................... 34/1
3,979,836  9/1976  Grassmann ................................ 34/1
4,280,033  7/1981  Wagener et al. ......................... 34/1

Primary Examiner—Larry I. Schwartz
Attorney, Agent, or Firm—Kenyon & Kenyon

[57] ABSTRACT

A capacitive high-frequency drying system for drying moisture-containing material in which hot air is passed through the high-frequency oven is disclosed. For better energy utilization, the air is preheated by the waste heat of the high-frequency generator, and is conducted, after passing through the oven, through a heat exchanger for heating water for utility or industrial purposes.

5 Claims, 2 Drawing Figures

CAPACITIVE HIGH-FREQUENCY DRYING APPARATUS

BACKGROUND OF THE INVENTION

The present invention relates to capacitive high-frequency drying apparatus with supplemental hot air heating for drying moisture-containing material.

Capacitive high-frequency drying apparatus with supplemental hot air heating of the type discribed in DE-OS No. 28 17 067 have found wide acceptance. The drying process is equalized by the supplemental hot air heating, and steam emerging from the moisture-containing material in the capacitive drying oven is carried by the hot air passed through the oven and discharged.

OBJECT AND SUMMARY OF THE INVENTION

It is an object of the present invention to improve the overall energy utilization in a capacitive high-frequency drying apparatus having supplemental hot air heating.

This and other objects are achieved according to the invention by preheating the air used for the supplemental hot air heating with waste heat produced by the capacitive high-frequency generator and recovering heat from the steam-laden air discharged from the capacitive drying oven. Thus, the drying air, prior to passing through a main air heating device, is preheated by the dissipation heat produced by the cooling of the high-frequency generator, and a heat exchanger is provided for transferring heat from the hot air and steam discharged from the drying oven to a second fluid medium.

The main air heating device is preferably controlled by means of an oven air temperature control such that the temperature of the air falls below the condensation temperature of the water vapor (steam) carried along by the air discharged from the drying oven only in the heat exchanger. The second fluid medium is advantageously water so that a large part of the energy generated by the heating device and the dielectric heating, respectively, can be utilized for heating the water, which can be used for utility and industrial purposes. This is of importance especially for industries in which considerable quantities of hot water are required such as in the textile industry.

To further increase the thermal efficiency of the system, the second fluid medium, which as mentioned can be water, can advantageously be preheated additionally by the waste heat of the high-frequency generator.

In an air-cooled high-frequency generator, the air for the supplemental hot air heating is advantageously taken from the cooling exhaust air of the high-frequency generator, and in a water-cooled generator, the air for the supplemental hot air heating is first preheated in the cooling water loop of the generator by means of a further heat exchanger.

A still further heat exchanger can be used to transfer waste heat from the high-frequency generator, either air- or water-cooled, to the second fluid medium to preheat it before the second fluid medium is passed through the heat exchanger disposed at the discharge end of the drying oven.

Advantageously, the generator, heat exchanger(s) and the heating device are structurally combined and insulated so that heat losses due to long lines or the like are avoided to the extent possible.

The above and other objects, features, aspects and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similiar parts and in which.

DESCRIPTION OF THE PREFERRED EMBODIMENT

Figure 1:
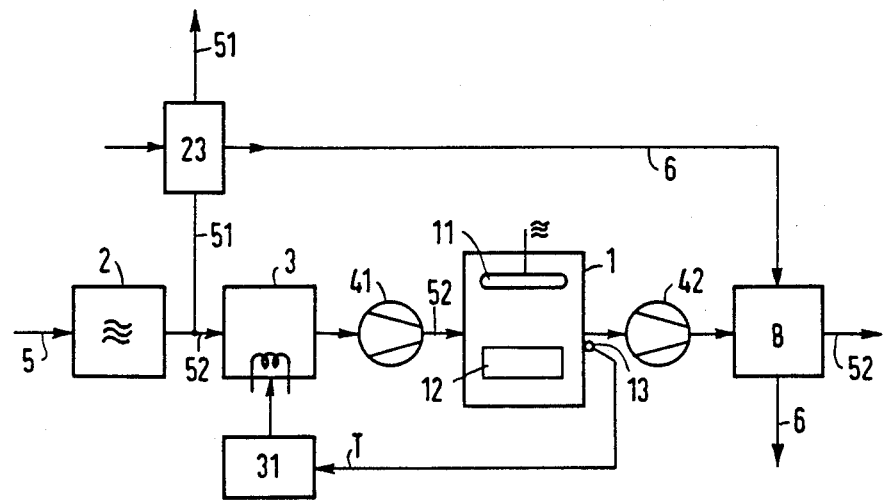
FIG. 1 is an energy flow diagram in a capacitive high-frequency drying apparatus according to the invention having an air-cooled high-frequency generator.
Figure 2:
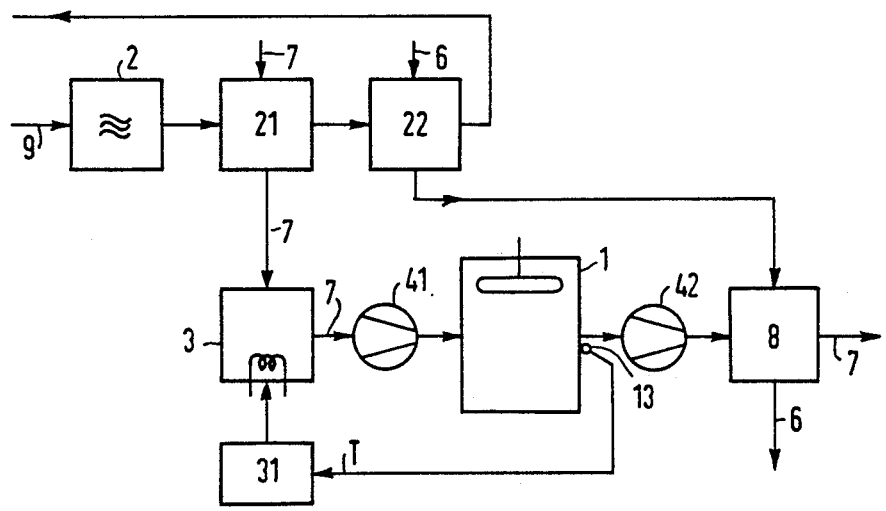
FIG. 2 is an energy flow diagram in a capacitive high-frequency drying apparatus according to the invention having a water-cooled high-frequency generator.

The capacitive high-frequency drying apparatus supplemented by hot air heating according to the invention shown in FIGS. 1 and 2 comprise a drying oven 1, electrodes 11 disposed in the oven 1, a high-frequency generator 2 to which the electrodes are connected, a heater device 3 for heating by oil, gas or electricity the air to be used in the supplemental drying, blowers 41 and 42 for forcing the heated air through the oven 1 and a heat exchanger 8, and a temperature control 31 for the heater device 3. The material 12 to be dried is heated to the required temperature by the dielectric heating and supplemental heating in the oven 1.

For the air-cooled high-frequency generator 2 of FIG. 1, ambient air 5 of above 20 degrees C. is passed through the high-frequency generator 2 to cool it and is preheated by the heat loss of the generator to about 60 degrees C. A part 52 at the exhaust of the generator 2 of the air heated by the generator 2 is conducted to and through the heating device 3. That air is further heated in the main heating device 3 to about 110 degrees C. and is then forced through the oven 1 by the blowers 41 and 42. The heated air passing through the oven 1 equalizes the temperature in the oven and is thereafter discharged from the oven carrying with it the vapor and steam produced by the dielectric heating at a temperature T of, for example, 105 degrees C. The air laden with steam and water vapor is then forced through the heat exchanger 8 and discharged into the atmosphere. In the heat exchanger 8, water 6 is heated from, for example, about 40 degrees C. to about 90 degrees C. primarily by the condensation heat of the steam and vapor carried by the air. The water 6, prior to passing through the heat exchanger 8, is preheated by the waste heat of the high-frequency generator 2 in a heat exchanger 23 through which a part 51 of the air from the exhaust of the generator 2 flows.

The air temperature in the oven 1 is measured at a measuring point 13 and maintained by a heating control 31 associated with the heating device 3 at a value such that the temperature upstream of the heat exchanger 8 does not fall below the condensation temperature of the vapor being carried by the air.

For the water-cooled generator 2 of FIG. 2, a heat exchanger 21 is provided in the loop of the cooling water 9 for the high-frequency generator 2. The heat exchanger 21 heats the ambient air 7 to, for example, 70 degrees C. The preheated air is then conducted to the main heating device 3 where it is further heated and then forced through the oven 1. As for the air-cooled embodiment of FIG. 1, the water 6 is preheated. A heat exchanger 22, through which the water 6 is passed before it is passed through the heat exchanger 8, is provided in the cooling water loop of the high frequency generator to preheat the water 6. In order to regulate the water temperatures a water flow control, not shown, can be provided.

Thus, in both embodiments, the heat introduced into the ove 1 is first preheated and then heated by the main heating device 3, and water 6, which can be used for utility or industrial purposes, is first preheated in a heat exchanger 23 or 22 and then heated in the heat exchanger 8.

In the air and water-cooled arrangements described above, the total usable energy can be increased substantially. For example, it is possible without difficulty, with 70 kW of high-frequency oven power output, 20 kW of heating power output for the heating device 3 and a power input of 150 kW, to recover in the heat exchangers, 90 kW of power which can be used for heating industrial water.

To reduce heat losses, the high frequency generator, the heat exchanger(s) and the heating device can be structurally combined with the oven.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of disclosure without departing from the spirit and scope of the invention.

What is claimed is:

1. A capacitive high-frequency drying apparatus for drying moisture-containing material, comprising a high frequency generator, a drying oven in which electrodes of the high-frequency generator asre disposed, a heating device for heating air, means for preheating air to be further heated by the heating device from heat produced by the high-frequency generator, means for conducting the preheated air to the heating device, means for conducting the heated air from the heating device to the oven, a heat exchanger, means for conducting air and water vapor from the oven to said heat exchanger, means for passing a liquid through said heat exchanger, means for preheating said liquid by the waste heat of the high-frequency generator, and means for controlling the heating device such that the temperature of the heated air falls below the condensation temperature of vapor carried with the heated air from the oven only after entering said heat exchanger.

2. The drying apparatus according to claim 1, wherein the high frequency generator is air-cooled and includes a hot air exhaust, said means for preheating air comprising means for transferring waste heat from the high-frequency generator to air passing thereby, and said means for conducting preheated air to the heating device conducting air from the exhaust of the high-frequency generator to the heating device.

3. The drying apparatus according to claim 1 wherein the high-frequency generator is water cooled and includes a cooling water circuit, said means for preheating air comprising a further heat exchanger arranged in the cooling water circuit of the high frequency generator, said means for conducting preheated air to the heating device conducting air from said further heat exchanger to said heating device.

4. The drying apparatus according to claim 1 wherein the high-frequency generator, the heat exchanger and the heating device are structurally combined with the oven.

5. The drying apparatus according to claim 1 and comprising means for regulating the temperature of said liquid.

* * * * *